Sept. 9, 1969  F. S. MARTIN  3,465,935
STRIP HANDLING SYSTEM
Filed Oct. 14, 1966  6 Sheets-Sheet 2

Sept. 9, 1969   F. S. MARTIN   3,465,935
STRIP HANDLING SYSTEM
Filed Oct. 14, 1966   6 Sheets-Sheet 6

United States Patent Office 3,465,935
Patented Sept. 9, 1969

3,465,935
STRIP HANDLING SYSTEM
Frank Samuel Martin, Wenham, Mass., assignor to The Gillette Company, Boston, Mass., a corporation of Delaware
Filed Oct. 14, 1966, Ser. No. 586,713
Int. Cl. B26f 3/00; B23d 25/00
U.S. Cl. 225—103                                19 Claims

ABSTRACT OF THE DISCLOSURE

Apparatus for inspecting and segmenting sharpened steel razor strip stock into a series of razor blade lengths includes a supply station which holds a coil of razor blade stock; a pair of pullout rollers and a tension and brake control responsive to the operation of the pullout rollers; a vacuum tension control block for applying a controlled amount of tension to the strip stock; a series of inspection stations which sense defects in the sharpened strip; apparatus for placing pairs of U-shaped tabs on the inspected strip; tab detector apparatus for checking the proper placement of the tabs; a segmenting station at which the strip is snapped into razor blade lengths between the tabs of each pairs; and a loading station where the good razor blade lengths are deposited into a tray and the defective blade lengths are discarded.

---

This invention relates to apparatus and components thereof for segmenting strip material and more particularly to apparatus for forming strip segments from a continuous ribbon of thin steel having a razor edge thereon for use in strip razors of the type disclosed in U.S. Patent No. 3,262,198.

A number of criteria must be met by any apparatus for segmenting a continuous ribbon of sharpened razor steel. Manufacturing tolerances require that segmenting be accomplished with a high degree of accuracy. At the same time, it is desirable that segmenting tools be avoided which have sharpened cutting edges which will dull through wear and which will require frequent and expensive replacement. Obviously, any apparatus for segmenting material having a razor edge must also be designed to avoid any damage to the delicate edge and to minimize any safety hazard to operating personnel. Because continuous strip material is supplied in coils, it is necessary to provide tension to the coil and braking means to stop the coil on reduction of machine speed so that the strip will not have a tendency to uncoil as a result of loss of tension. It is also necessary to assure accuracy of segmenting that tension be applied to the continuous ribbon during the segmenting operation. On the other hand, it is desirable to avoid the complication of a system which requires the large and changing mass of a coil of strip material to be rapidly and frequently accelerated and decelerated, a problem which arises from the inherent intermittent nature of a segmenting operation.

It is therefore a principal object of this invention to provide apparatus which will simply, accurately and with minimal danger and risk of damage to the delicate razor edge thereof, segment a continuous ribbon of razor steel. It is also an object of this invention to provide segmenting means which will reconcile the apparently conflicting criteria of accuracy and avoidance of cutting edges. Another object of this invention is to provide appropriate tension and brake means at the supply of coiled ribbon material. Yet another object of this invention is to provide an arrangement of tensioning means throughout the segmenting apparatus. Still another object of this invention is to provide an arrangement of components thereof in which the coil from which the strip material is drawn may be rotated at a more or less uniform rate despite the intermittent nature of the segmenting operation.

It has been discovered that the objects of this invention may be achieved in apparatus in which pairs of tabs are placed on the strip adjacent each other and in which the strip is segmented by transverse movement of one of the tabs relative to the other thus breaking the strip between the tabs. The tabs stiffen the strip thereat to permit breaking without cutting. Additionally, they provide a readily detectable and adjustable reference to assure accuracy in segment sizing. Also they provide protrusions which may be mechanically manipulated in simple fashion for applying tension to the strip.

In general, this invention features apparatus having at one end thereof a supply station for rotatably receiving a supply coil of strip material and, at the other end of the apparatus, segmenting means for segmenting the strip material. The segmenting means includes two pairs of jaws closely spaced together in the path of the strip material, one pair of jaws being transversely movable relative to the other pair to a position beside the strip path for segmenting the strip. In the preferred embodiment of this invention, intermediate the supply station and the segmenting means in the path of the strip, is provided tab placement apparatus for placing pairs of tabs adjacent each other to define the point of strip segmenting.

This invention also features in addition to the segmenting means, tension control and brake means at the supply station for continuously applying a tensioned force to the strip material as it passes from the coil thereof, a bi-directional tension control mechanism for exerting a back tension on the strip therefrom to the segmenting means and for maintaining tension therebehind toward the supply station, and a tab detecting and fine adjustment mechanism for detecting proper placement of tabs by the tab placement apparatus and for adjusting the position of the strip immediately prior to the placement of the next pair of tabs.

Other objects, features, and advantages of this invention will be appreciated by those skilled in the art from the following detailed description thereof together with the accompanying drawings in which.

Figure 1:
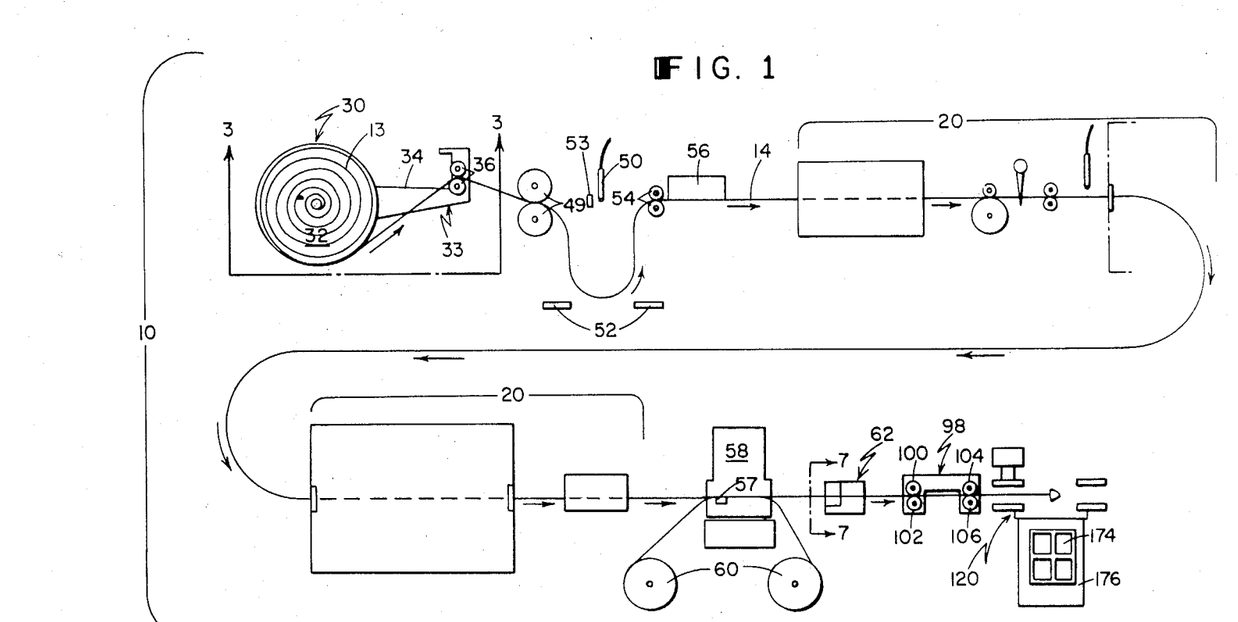
FIG. 1 is a diagrammatic plan view of segmenting apparatus according to the invention.
Figure 2:
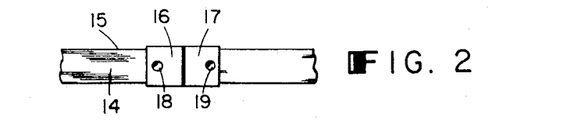
FIG. 2 is an enlarged elevation of a portion of the strip material having tabs placed thereon prior to segmenting.

As will be seen from FIG. 1 of the drawings, the segmenting apparatus 10 includes a plurality of components lienarly arranged (the bends in the strip 14 path shown in FIG. 1 being used only to diagrammatically indicate continuity thereof) between a supply station 30 and the segmenting station 120. Pullout rollers 49 positioned in the strip path after supply station 30 draw the strip 14 from the coil 13 thereof at supply station 30. Pullout rollers 49 draw the strip 14 from coil 13 at the average speed of the strip through the remainder of apparatus 10. As shown in FIG. 2 the strip 14, of razor steel, has a razor edge 15 which is fed in an upright position through apparatus 10 to avoid damage thereto.

A tension control and brake assembly 33 is provided between pullout rollers 49 and supply station 30 for exerting a tensional force on strip 14 at the coil 13 thereof at station 30 in the direction of rotation thereof and for braking the coil in response to a tension decrease below a predetermined level.

After pullout rollers 49 the strip 14 path forms a slack loop containing a greater amount of strip material therein than a segment length thereof, which loop is maintained by a flow of air from jet 50. Photoelectric cell detectors 52 are provided at the position of the loop to sense any increase in the loop beyond the position therebetween to signal pullout rollers 49 to slow down or stop. Microswitch 53 detects and signals any loss of the loop. From rollers 49 movement of strip 14 through apparatus 10 is incremental, the slack loop, however, permitting the strip 14 to be drawn from coil 13 at a relatively constant speed.

From the loop the strip 14 proceeds between guide rollers 54 and thence to a vacuum tension control block 56 which exerts a retarding force on the strip 14 as it passes therefrom. The vacuum tension control block 56 simply comprises a block adjacent the side of the strip path having perforations at that side through which a vacuum is applied to the side of the strip 14. The frictional engagement of the strip 14 and the block 56 thereby engendered creates a tension in the strip 14 from that point forward in the apparatus.

From the vacuum tension control block 56, the strip 14 passes through a series of inspection stations 20 which are adapted to detect any defects in the strip 14 and to store the information in a mechanical memory cell (not shown) to signal actuation of a rejects mechanism at a later stage when the strip 14 reaches the rejects mechanism. Details of structure and function of these inspection stations may be had with reference to copending patent application, assigned to the same assignee as this application, Ser. No. 586,843, filed Oct. 14, 1966, entitled "Strip Inspection System."

From the inspection stations the strip path extends through tab placement apparatus 58 which is positioned three strip segment lengths from the segmenting means 122, later to be described, for operation in the stopped position of the incremental movement of strip 14 therethrough. At the tab placement apparatus 58 tabs 16 and 17, FIG. 2, comprising generally U-shaped members with a perforation 18, 19 on one side thereof are fed from feed bowls 60 and placed on strip 14 side by side. The tabs are fastened at placement apparatus 58 to the strip 14 by punches which move through apertures 18 and deform the strip material and portion of tabs 16, 17 therebehind. Also at apparatus 58 is another vacuum tension control block 57, similar to block 56, to assist in tensioning the strip 14 and to prevent wavering of the strip 14 as tabs 16, 17 are placed thereon.

In the embodiment disclosed in FIG. 2, the apertures 18, 19 are placed as far as possible from the abutting ends of the tabs 16, 17 to provide extra strength; however, depending on the materials used, it may be possible to position the apertures in the center of the tabs so that there will be no need to distinguish between right and left hand tabs. The tabs 16, 17 are of electrically conductive material for testing at the next station in the apparatus 10.

From the tab placement apparatus the strip path moves through fine adjustment and tab detector apparatus 62 which adjusts the position of the strip 14 prior to the placement of the next set of tabs 16, 17 by placement apparatus 58 to assure accuracy of placement thereof, and which detects the presence or absence of tabs and in the absence of one or more tabs signals an apparatus stop circuit.

From the fine adjustment and tab detector mechanism 62 the strip 14 moves to bi-directional control apparatus 98 which prevents any slack from moving backwardly through the strip 14 thereby to maintain tension therebehind and which also functions to exert a retarding tensioning influence on the strip 14 as it passes therefrom to the segmenting station 120 next in the line of the strip path.

Finally the apparatus 10 is provided with a segmenting station 120 at which means are provided for pulling the strip through the apparatus, for segmenting the strip at the position between tabs 16, 17, for depositing the strip in trays 174 on a conveyor 176 therebelow, and for rejecting a defective strip segment.

Figure 3:
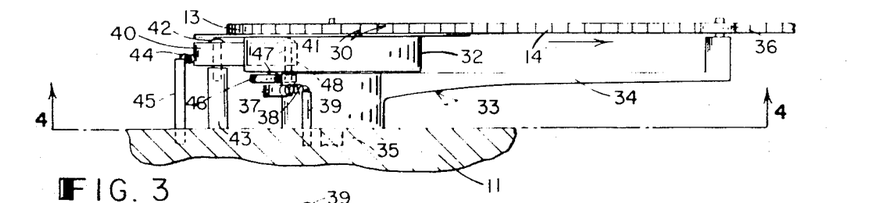
FIG. 3 is an enlarged side elevation of the supply station of the apparatus taken along the lines 3—3 of FIG. 1.
Figure 4:
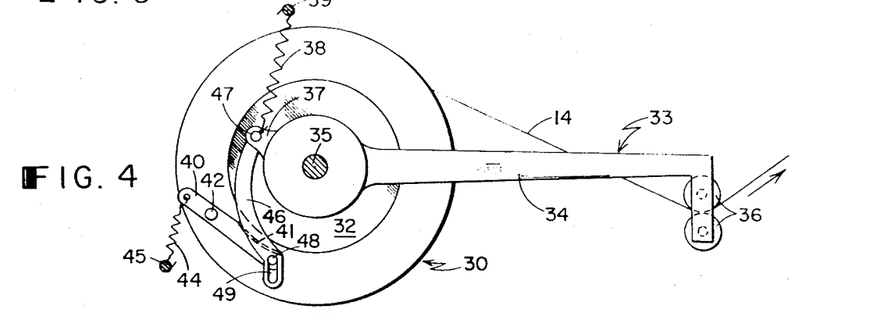
FIG. 4 is a view taken along the lines 4—4 of FIG. 3.

In greater detail, supply station 30 includes a rotatable table 32 mounted on apparatus frame 11 as shown in FIGS. 3 and 4 on which a coil 13 of strip razor steel 14 is mounted with its sharpened edge 15 up, as in FIG. 2. As is perhaps best shown in FIG. 4 the tension control and brake assembly 33 at station 30 includes a tension arm 34 pivotally mounted coaxially of table 32 about shaft 35. Arm 34 extends generally in the direction of the path of strip 14, as it leaves the coil 13, and has on the end thereof a pair of freely rotatable guide rollers 36 through which the strip 14 passes as it is drawn by pullout rollers 49. A spring 38 is interconnected between an extension 37 of arm 34, to the other side of pivot 35 from guide rollers 36, and a stationary post 39 mounted in frame 11 thereby biasing arm 34 in the direction of rotation of table 32 and creating a tensioning force on a strip 14 between coil 13 and pullout rollers 49.

Brake arm 40 having a brake surface 41 adapted to engage the circumferential surface of table 32 is pivotally mounted by pivot pin 42 on a post 43, mounted in frame 11, for movement against and away from table 32. A spring 44 interconnected between brake arm 40 and another post 45 mounted in frame 11 normally biases the brake arm 40 toward table 32. A link 46 pivotally connected to extension 37 by pivot pin 47 interconnects tension arm 34 and brake arm 40. The link 46 is connected to arm 40 by shaft 48 fixedly mounted on brake arm 40 and slidably positioned within a slot 51 in the end of link 46 thereadjacent, slot 51 extending generally in the direction of movement of link 46.

Figure 5:
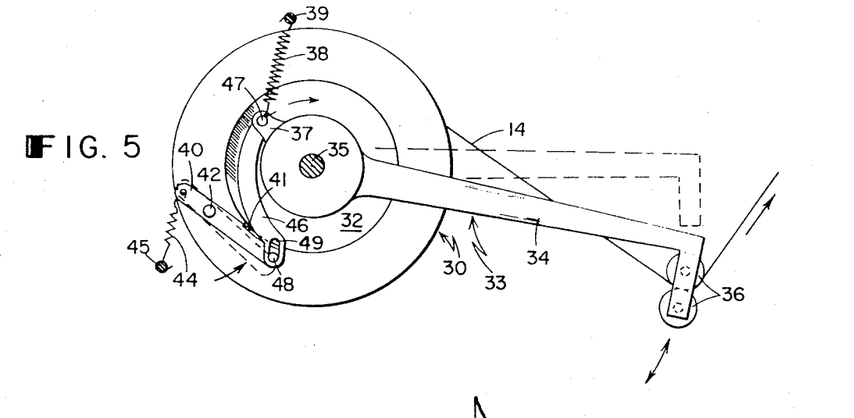
FIG. 5 is a view similar to FIG. 4 showing a different operating position of the tension control and brake assembly at the supply station.

In operation, if tension in the strip 14 as it leaves coil 13 is reduced the spring 38 exerts a force on arm 34 to move that arm in the direction of rotation of the coil thereby to exert a tension between the coil 13 and pullout rollers 49. As arm 34 thus rotates, spring 44 urges brake arm 40 into engagement with table 32 to apply a braking force thereto. Elongated slot 51 allows arm 34 to continue to rotate, under the influence of spring 38, and take up slack between coil 13 and pullout rollers 49. As tension is increased in the strip 14, the procedure is reversed and the other end of slot 51 engages shaft 48 overriding the biasing force of spring 44 to move the brake arm 40 away from table 32, to permit free rotation thereof.

Springs 38 and 44 are selected for strength, and the moment arms thereof positioned, so that the force exerted by the spring 44 is substantially less than that of spring 38 as otherwise it obviously would be impossible to release the brake.

Figures 6, 7, 8:
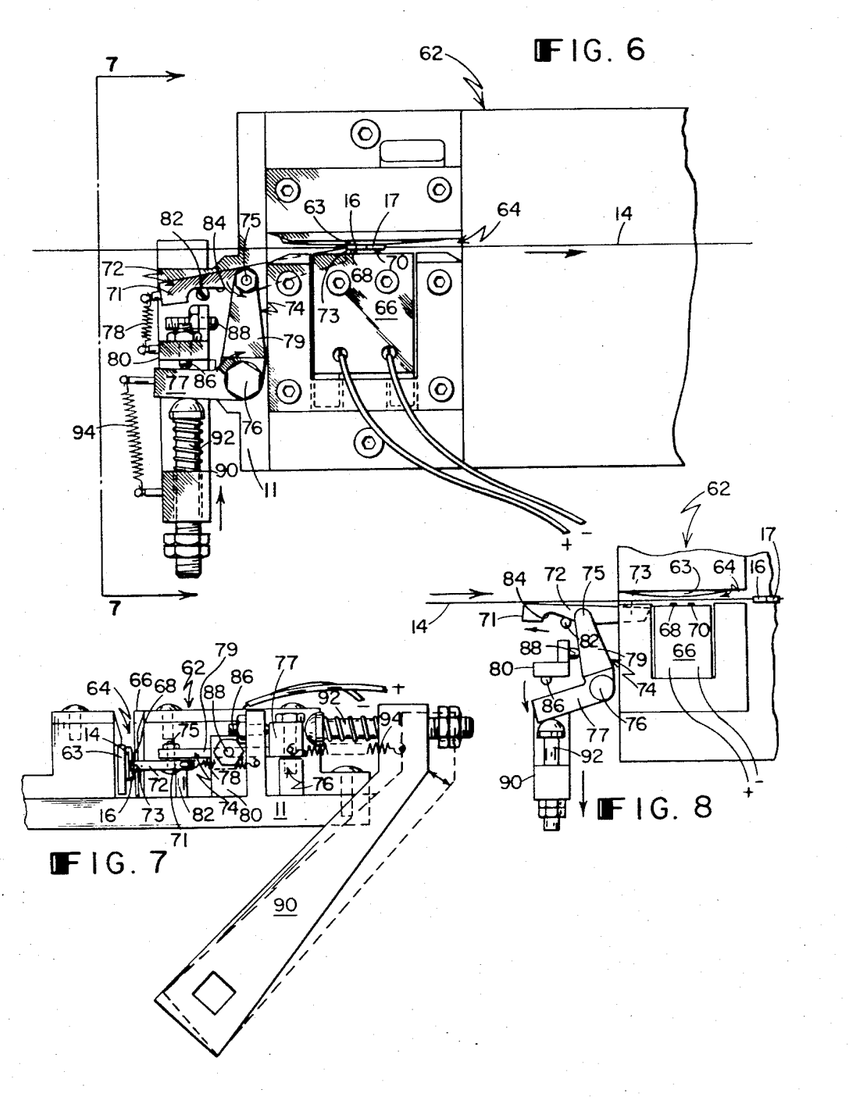
FIG. 6 is an enlarged plan view of the fine adjustment and tab detector mechanism utilized in the apparatus.
FIG. 7 is a view along the lines 7—7 of FIGS. 1 and 6, enlarged from the view of FIG. 1.
FIG. 8 is a reduced diagrammatic view similar to FIG. 6 showing a different operating position of the fine adjustment and tab detector mechanism.

The fine adjustment and tab detector apparatus 62, shown in FIGS. 6-8, includes a channel 64 through which strip 14 passes. One wall of the channel 64 is defined by a conductive wall 63 spaced from strip 14 by a distance equal to the thickness of the legs of tabs 16, 17 thereadjacent. Opposite wall 63 is a movable electrode carrier block 66 spaced two strip segment lengths from the segmenting means 122. Block 66 carries a pair of electrodes 68, 70. Block 66 is movable toward and away from wall 63 to complete an electric circuit between electrodes 68, 70, conductive tabs 16, 17 and wall 63 to determine the presence or absence of the tabs. The absence of the tab, signalled by an incompleted current, is used to signal the apparatus stop circuit.

Fine adjustment of the strip 14 relative to tab placement apparatus 58 is accomplished by tab adjustment arm 72 positioned to the rear of electrode 16 relative to the direction of strip movement thereby. Arm 72 is pivotally mounted at its middle portion on a pivot pin 75. One end 73 of the arm, adapted for engaging the rear edge of the trailing tab 16 of a pair, is positioned adjacent electrode carrier block 66 and the other end 71 thereof is interconnected by spring 78 with a stationary member 80, affixed to apparatus frame 11, to bias end 73 toward the strip 14. Pivot pin 75 connects arm 72 to the end of one leg 79 of an L-shaped member 74. Member 64 is pivotally mounted at pin 76 to frame 11. The leg 79 of member 74 extending between pivots 75, 76 is generally at right angles to arm 72 thereby carrying arm 72 in a direction generally parallel to the path of strip 14 on pivotal movement of the leg 79 about pivot 76. The other leg 77 of member 74, extending rearwardly from pivot 76, is biased by spring 94, extending therefrom to actuating arm 90, in a direction of counter clockwise rotation, for normally maintaining adjustment arm 72 in a position as shown in FIG. 8 remote from the tab positions at electrodes 68, 70. Spring loaded push rod 92 bears against the other leg 77 of member 74 and on movement of actuating arm 90, best shown in FIG. 7, actuates member 74 and arm 72 for movement of arm 72 to a position adjacent electrode 68. A stationary guide pin 82 engages an inclined surface 84 of arm 72 between pivot 75 and rear end 71 thereof to control the movement of the forward end 73 thereof to and away from the path of strip 14, as shown in FIGS. 6 and 8. Threaded members 86, 88 positioned to engage member 74, for limiting movement thereof in opposite directions, may be adjusted to control the stroke of arm 72 so that the forward end 73 thereof will stop precisely at a position one strip segment length from the rear edge of a tab 16 being placed by placement apparatus 58 therebehind.

In operation as a tab moves into channel 64 and stops during the incremental movement of strip 14, arm 90 is actuated to rotate member 74 clockwise thereby to move arm 72 to a tab 16 engaging position, FIGS. 6 and 7. The tab 16 is thereby engaged at its rear edge by lead portion 73 of adjustment arm 72 and is moved, if necessary, to an accurate position relative to tab placement apparatus 58, one segment length therefrom, prior to the placement of a next set of tabs 16, 17. Immediately thereafter the electrode carrier block 66 is advanced to engage the tabs and a current is passed through electrodes 68, 70 to detect their presence or absence and to signal an apparatus stop circuit if one or both of the tabs is missing. The block 66 is in no event, however, advanced further than the maximum distance which would be required to complete a circuit through the electrodes 68, 70, tabs 16, 17 and wall 63. The electrode carrier 66 is then retracted and the actuating arm 90 is released causing retraction of adjustment arm 72 before the strip 14 is again moved.

Figure 9:
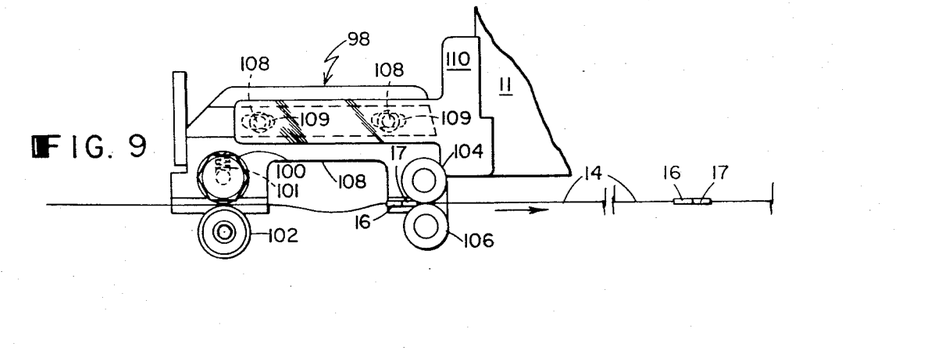
FIG. 9 is an enlarged plan view of bi-directional tension control mechanism utilized in the apparatus.

Bi-directional tension control mechanism 98 shown in FIG. 9 is provided immediately after the tab adjustment and detecting apparatus 62. The tension apparatus 98 includes two pairs of rolls 100, 102, and 104, 106. The nip of lead rolls 104, 106 is positioned slightly less than one strip segment length behind the stopped position of a trailing tab 16 of a pair in the segmenting means 122 so that the lead tab 17 of a pair just en gages the rear edges of the nip therebetween as the strip 14 stops during incremental movement thereof. The surfaces of rolls 104, 106 are of resilient materials, such as rubber, so that any forward force exerted on the strip 14, other than a force drawing the lead tab 17 into the nip of the rolls 104, 106 will create a slight amount of retarding tension.

One of the trailing rolls 100, 102 moves only in a forward direction at the nip thereof, as by a one-way clutch, to prevent any slack created by the back pressure of rolls 104, 106 on tab 17 from passing behind the tension control mechanism 98 thereby causing loss of tension through apparatus 10 to vacuum tension block 57. One of the trailing rolls is mounted for transverse movement relative to the path of strip 14 and is biased against the other roll by a spring 101 to create a gripping pressure on strip 14 and to permit passage of tabs 16, 17 thereby. The bi-directional tensional control mechanism 98 is mounted on a bracket 110 via fasteners 108. Slots 109 at the fasteners 108, permit adjustment of the control mechanism 98 for proper positioning of the nip of rollers 104, 106.

Figure 10:
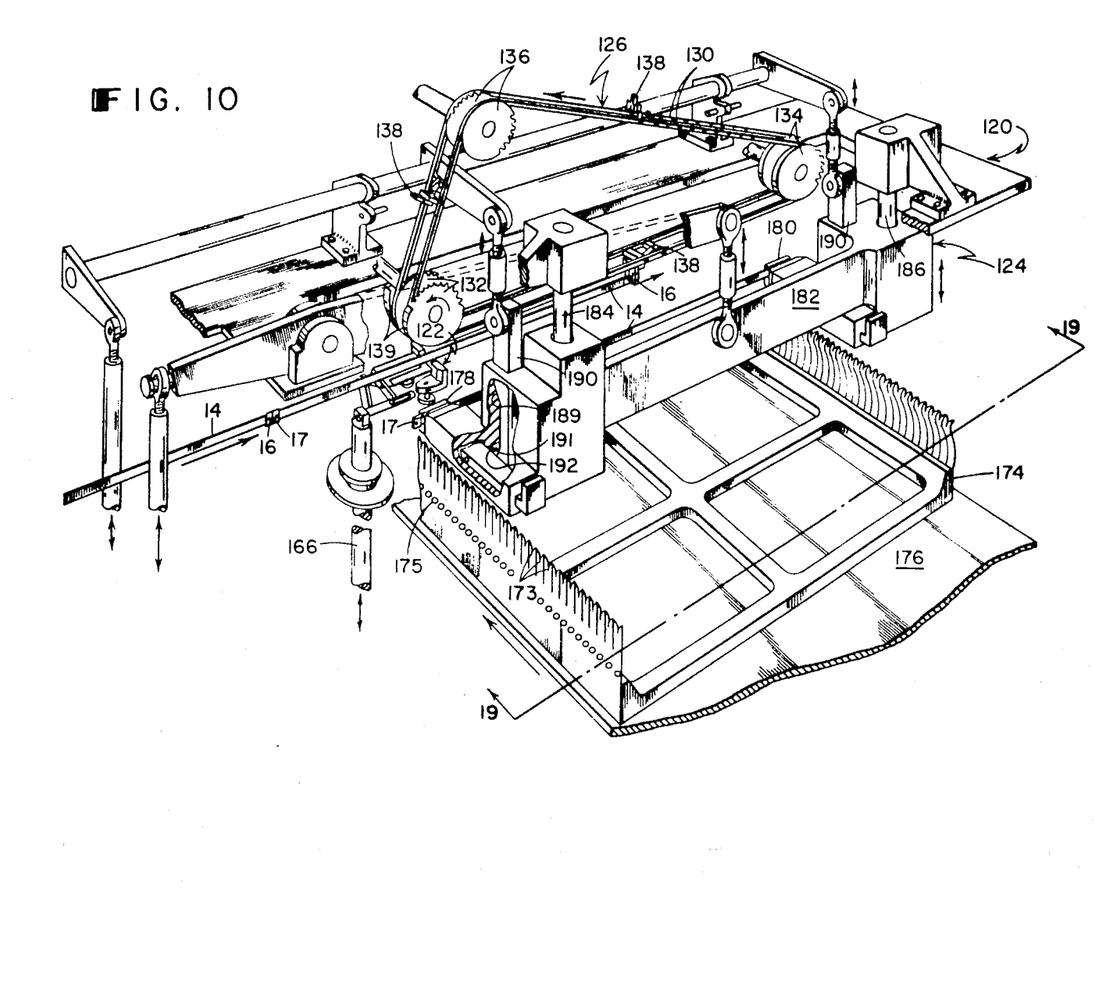
FIG. 10 is an enlarged isometric view of the segmenting station of the apparatus.
Figures 18, 19:
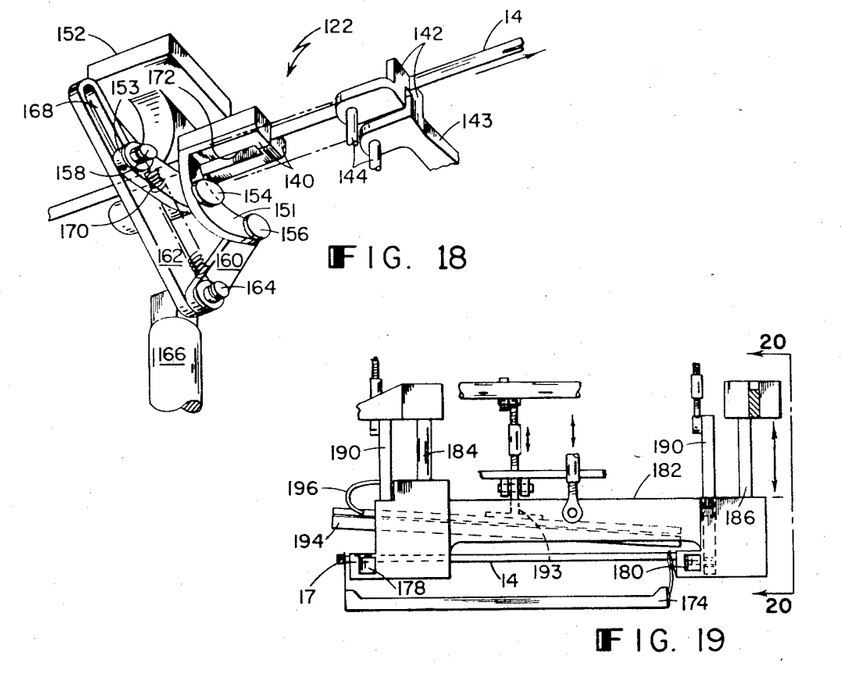
FIG. 18 is a partially exploded isometric view from below of the segmenting jaws.
FIG. 19 is a fragmentary view taken along the lines 19—19 of FIG. 10.
Figure 20:
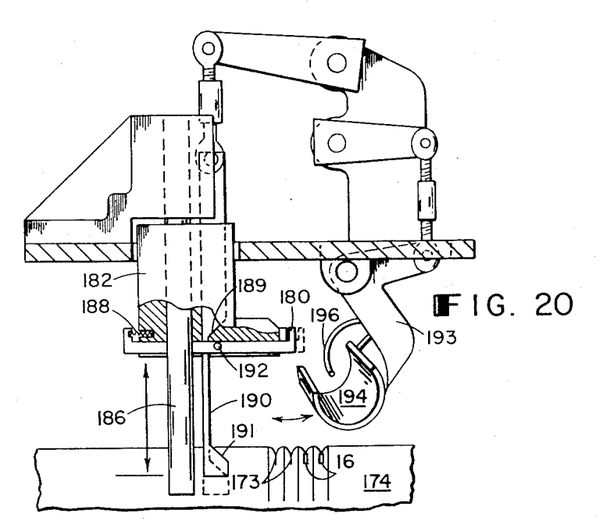
FIG. 20 is an enlarged view taken along the lines 20—20 of FIG. 19.

The segmenting station 120 is next provided and includes segmenting means 122, blade deposit mechanism 124, traverse mechanism 126, as shown in FIG. 10, and rejects mechanism best shown in FIGS 19 and 20.

Figures 11, 12, 13, 14, 15, 16, 17:
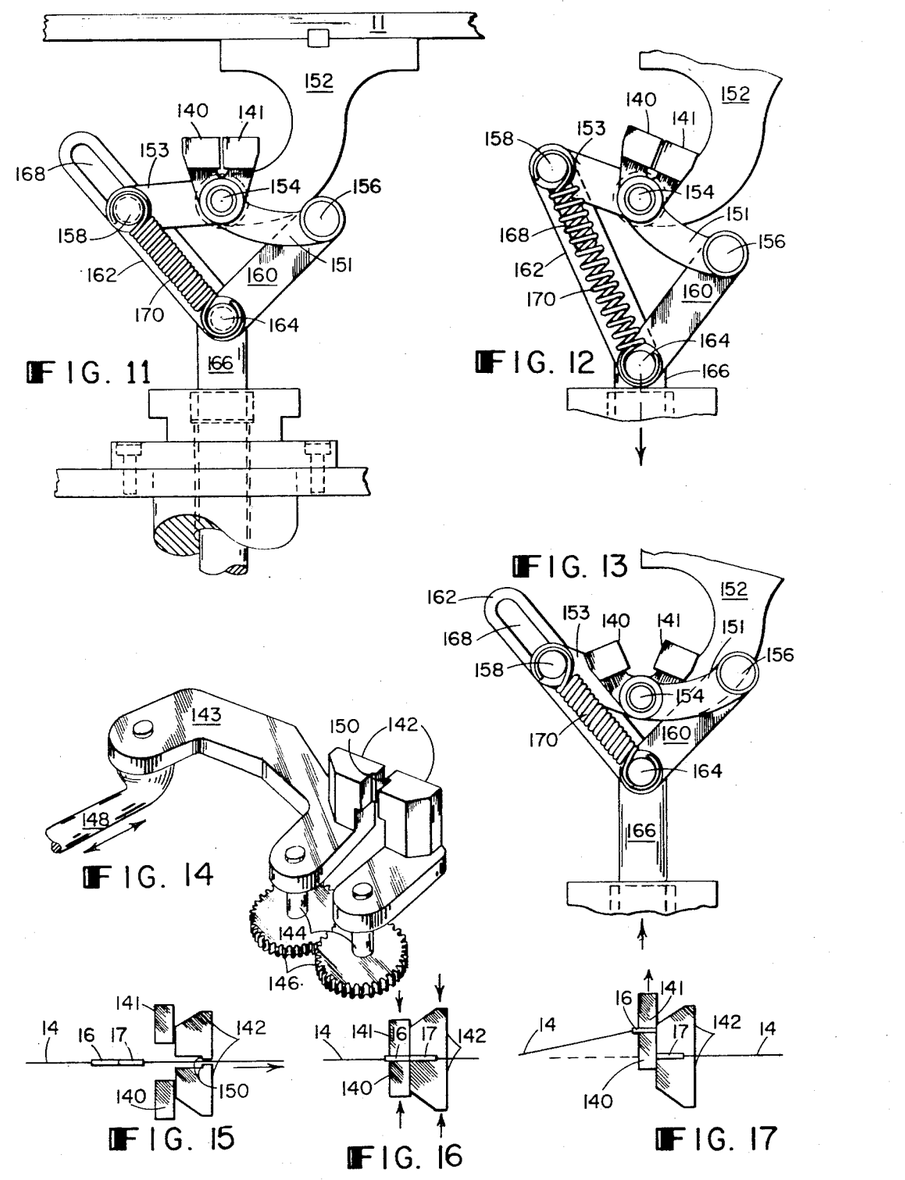
FIG. 11 is an enlarged end view of the trailing pair of segmenting jaws.
FIGS. 12 and 13 are views similar to FIG. 11 showing different operating positions of the trailing jaws.
FIG. 14 is an enlarged isometric view of the lead pair of segmenting jaws.
FIGS. 15, 16 and 17 are diagrammatic plan views of the segmenting jaws in different operating positions thereof.

The segmenting means 122 best shown in FIGS. 11–18, includes two pair of segmenting jaws 140, 141 and 142 closely spaced together as shown in FIGS. 15–17. Lead jaws 142 are supported on vertical rotatable shafts 144 which are interconnected by gears 146 for opening and closing jaws 142. One of the lead jaws 142 is provided with an extension arm 143 to which actuating rod 148 is connected tangentially for rotating the jaw about shaft 144. The interconnection of gears 146 causes simultaneous movement of the other of the jaws 142. The bite of the jaws 142 lies in the path of strip 14 and shafts 144 are spaced from the bite of the jaws 142 generally along the path of the strip. The lead jaws 142 each have a recessed configuration providing stops or shoulders 150 in the direction toward which the strip is moving. Each of the shoulders 150 has a depth less than the thickness of one leg of the U-shaped tabs 16, 17 thereby permitting pressure to be exerted by the jaws 142 directly on the tabs rather than on strip 14. As best illustrated in FIGS. 16 and 17 the recessed configuration has a length from shoulders 150 along the path of strip 14 exactly equal to the length of the tab thereon.

Trailing jaws 140, 141, FIG. 11, also have a bite along the path of strip 14. The trailing jaws 140, 141 extend to a common pivot below the bite and are there pivotally supported by pivot pin 154 from bracket 152. The trailing jaws 140, 141 cross in scissors fashion at pivot 154 extending therefrom to ends 151, 153 spaced apart. The ends 151, 153 of jaws 140, 141 are connected to links 160, 162 which in turn are connected to vertically movable actuating rod 166. Links 160, 162 are connected to rod 166 therebelow by pivot pin 164 vertically aligned with pivot pin 154, and one of the links 160 is connected by pivot pin 156 to the end 151 of one of the jaws 140. The other jaw 141 is connected at its end 153 to link 162 by a shaft 158 slidably positioned in a slot 168 of the link 162 outwardly inclined relative to pivot 164. Spring 170 interconnecting shaft 158 and pivot pin 164 biases the end of jaw 141 to the lower end of slot 168, the lower end of the slot 168 being positioned for abutment with shaft 158 in a vertical position of the bite of jaws 140, 141.

Hence on movement of rod 166 upwardly, as in FIG. 13, the jaws 141, 142 open symmetrically about the path of strip 14 as links 160, 162 are forced outwardly bearing upon pin 156 and shaft 158. On movement downwardly of rod 166, however, the jaws first close as in FIG. 11 and then as rod 166 continues to move downwardly the force exerted through link 160 causes rotational movement of both jaws 140, 141 about pivot 154 transversely of the strip path and of lead jaws 142 and shaft 158 approaches the upper end of slot 168 of link 162 as in FIG. 12. This transverse movement causes segmenting of the strip 14 clamped therein between tabs 16, 17.

Preferably the trailing jaws 140, 141 as shown in FIGS. 15–17 do not extend all the way to the rear of trailing tab 16. Also, as shown in FIG. 18, preferably the bite of jaws 140, 141 are spaced forwardly of the pivots and links and are spaced apart a substantial distance providing a gap 172 therebetween behind the bite of the jaws 140, 141. This accommodates of the traverse mechanism next to be described.

The traverse mechanism 126 is best shown in FIG. 10 includes a pair of parallel sprocket chains 130 and three pairs of sprocket wheels 132, 134, 136 about which the chains 130 extend. The traverse chains 130 are driven through sprocket wheels 134 and a clutch (not shown) which slips when the segmenting jaws 140, 141 and 142 engage tabs 16, 17. Carried on the sprocket chains 130 are three traverse jaws 138 normally spring closed. The traverse jaws 138 are spaced apart a distance slightly greater than a strip segment length. Cam surfaces 139 spaced above the trailing segmenting jaws 140, 141 engage the traverse jaws 138 and cause them to open, as they descend upon a strip 14 at the trailing segmenting jaws 140, 141, and then to close as they are carried to the plane of strip 14 at trailing jaws 140, 141. Pivoted arms (not shown), mechanically operated, open the traverse jaws 138 at the end of the strip segment length. The traverse jaws 138 supply the incremental motive force for the strip 14 after it leaves pullout rollers 49.

The blade deposit mechanism 124 provided at segmenting station 120, shown in FIGS. 10 and 20, includes a vertically movable carrier 182 which is guided along vertical guide posts 184, 186 between the strip path and a position therebelow for depositing strip segments in slots 173 of tray 174 supported on conveyor belt 176.

Slots 173 of tray 174 are provided in vertical walls of the tray which is positioned on a conveyor 176 disposed for transverse incremental movement relative to the path of strip 14 thereabove. At least one wall of tray 174 is resilient to maintain strip segments therein under tension. Holes 175 on the sides of tray 174 are provided at predetermined intervals therealong for indexing the tray in proper position in cooperation with aligning pins (not shown) which are movable to engage the holes 175.

The blade deposit mechanism 124 is provided with gripping jaws 178, 180 aligned with the path of strip 14. Transverse pins 192 extending from jaws 178, 180 within cavities in carrier 182 are adapted to be engaged by inclined surfaces 189, 191 of vertically movable actuating member 190 extending slidably through carrier 182 for opening and closing the jaws. Springs 188 between rearward extensions of jaws 178, 180 and carrier 182 normally bias the jaws to a closed position, however, when the inclined surfaces 189, 191 of actuating members 190 strike pins 192, they override the biasing pressure of springs 188 to open the jaws 178, 180.

The rejects mechanism, FIGS. 19, 20, comprises an inclined rejects trough 194 mounted on a swing bracket 193 and has an air line at the elevated end thereof. The swing bracket 193 is adapted, on a signal from magnetic read out apparatus at stations 20, to move the rejects trough 194 under the path of strip 14 to collect a rejected strip segment. Air supplied through tube 196 thereupon removes the rejected segment to a collection station (not shown).

In operation, at the commencement of a cycle, trailing segmenting jaws 140, 141 are clamped on the lead tab 16 of a strip segment and lead segmenting jaws 142 are opened. Traverse jaws 138 move down over the segmenting means 122 and are opened by cam surfaces 139 and are then closed to engage the strip behind tab 16 as the traverse jaws move into the plane of strip 14. Immediately thereafter, the trailing jaws 140, 141 open and the traverse jaws 138 carry the strip forward, vacuum tension block 56 providing tension to the strip 14 as it is carried forward. As the strip 14 is carried forward, the lead jaws 142 are partially closed, as in FIG. 15, so that the lead tab 17 of a pair will stop against the shoulders 150. As the tab 17 strikes shoulders 150 of lead jaws 142, the clutch through which the traverse jaws are driven slips and movement of the strip ceases. As this occurs both sets of jaws 140, 141 and 142 are clamped tightly on tabs 16, 17, as in FIG. 16. Pullout rollers 49 meanwhile are continuously drawing strip 14 from coil 13 into the loop formed by air jet 50. If excess material is fed to the loop, it is sensed as it interrupts the signal of cells 52. The tension control and brake assembly 33 operates as heretofore described to maintain tension on coil 13.

As the segmenting jaws 140, 141 and 142 are clamped on strip 14 the fine adjustment and tab detecting apparatus 62 is activated for adjustment of the position of tabs 16, 17 thereat if necessary and to detect the presence or absence of the tabs, all as previously described. Immediately after the fine adjustment is made of the tab positions, the tab deposit apparatus 58 places another set of tabs 16, 17 on the strip and the trailing segmenting jaws 140, 141 are activated to move transversely relative to the path of the strip thereby segmenting the strip 14 between the tabs 16, 17 thereat as shown in FIG. 17. As the segmenting occurs, the fine adjustment and tab detector apparatus 62 is deactivated.

Also, as the segmenting occurs, jaws 178, 180 of the blade deposit mechanism 124 are carried upwardly by carrier 182 to engage the segment extending from the lead jaws 142 to traverse jaws 138. Actuating members 190 are activated and surfaces 189 thereof engage pins 192 to open jaws 178, 180 and then disengage pins 192 to close the jaws 178, 180 on the severed strip segment. The lead jaws 142 are then opened and the blade deposit mechanism moves downwardly carrying the severed strip segment with it to tray 174. As the strip segment is placed in the tray the jaws 178, 180 are again opened by activating actuating members 190 engaging surfaces 191 and pins 192 and the jaws are then moved downwardly to clear the deposited strip segment. Conveyor 176 is then activated to move and index tray 174, in cooperation with the aligning pins (not shown), incrementally, forward to clear jaws 178, 180 which are then closed and moved upwardly again to take the next strip segment.

The timing and sequence of operations is controlled by a number of cams (not shown). In the event the rejects mechanism is activated, the cam pattern is shifted and jaws 178, 180 remain in a position below the strip path at tray 174 during the next cycle and trough 194 is moved under the path of the rejected strip segment. Thereupon, when the rejected segment is released by lead jaws 142 and traverse jaws 138, it falls into the tray and is discarded by air from tube 196.

As the trailing jaws 140, 141 are rotated to segment strip 14, they exert a slight forward movement on strip 14 which normally takes up any slack created by operation of the fine adjustment apparatus 62. The back tension exerted by the nip of the resilient rolls 104, 106 of the bi-directional tensional control mechanism 98 prevents damage to the strip 14, as the traverse jaws 138 descend thereupon after trailing jaws 140, 141 are returned from a transverse position relative to the strip path, by pulling back on the strip 14 to remove any resulting slack between the rolls 104, 106 and trailing jaws 140, 141 thereby maintaining the strip 14 in an erect position. If this provision were not made, the slack created by the transverse and return movement of trailing jaws 140, 141 could result in the traverse jaws 138 striking the sharpened edge 15 of the blade strip 14 thereby damaging the blade. Rolls 100, 102 operate to confine any resulting slack to the bi-directional tension control mechanism 98 between rolls 100, 102 and 104, 106.

What is claimed is:

1. Apparatus for segmenting strip material, comprising:
   a supply station for said strip material at one end and a segmenting station at the other end defining a strip path therebetween;
   two pair of adjacent segmenting jaws at said segmenting station having an aligned clamping bite along said path for gripping said tabs between said jaw pairs, the position between said adjacent pairs of jaws defining said segmenting position, one of said jaw pairs transversely movable relative to said path and the other of said jaw pairs for segmenting said strip material at the position between said one and said other jaws pairs as said strip material is gripped by said jaw pairs; and
   means for advancing said strip material with said tabs thereon along said path to said segmenting position between said pairs of segmenting jaws.

2. The apparatus claimed in claim 1 in which said supply station includes a rotatable member for rotatably receiving a supply coil of said strip material and further including tension control and brake means for maintaining a predetermined minimum tension on said strip material at said coil and for braking said coil in response to tension decrease below a predetermined level.

3. The apparatus claimed in claim 2 further including driven pullout rollers in said path between said tension control and brake means and said intermediate station for drawing said strip material from said coil into a slack loop immediately thereafter at the average speed of said strip incrementally thereafter.

4. The apparatus claimed in claim 3 further including means along said path intermediate said rollers and said intermediate station for applying a retarding tensioning force to said strip material as it passes thereby.

5. The apparatus claimed in claim 4 in which said one jaw pair is the trailing pair of said jaws relative to the direction of movement of said strip material along said path and further including bi-directional tension control means in said path immediately behind said one jaw pair thereadjacent including means for applying a retarding tensioning force to said strip material therefrom to said one jaw pair and means therebehind in said path for preventing back-movement of said strip material therefrom.

6. The apparatus claimed in claim 1 in which said one jaw pair is the trailing pair of said jaws relative to the direction of movement of said strip material along said path and further including bi-directional tension control means in said path immediately behind said one jaw pair thereadjacent including means for applying a retarding tensioning force to said strip material therefrom to said one jaw pair and means therebehind in said path for preventing back-movement of said strip material thereby.

7. The apparatus claimed in claim 1 further including tab placement means at an intermediate station along said path, a predetermined number of strip segment lengths before a strip segmenting position at said segmenting station, for affixing pairs of tabs in abutment on said strip material with the position between said tabs said predetermined number of strip segment lengths before said segmenting position, thereby defining ends of adjacent strip segments.

8. The apparatus claimed in claim 7 further including fine adjustment and tab detector means, spaced along said path a predetermined number of strip segment lengths between said segmenting position and said tab placement means, including means for detecting the presence or absence of said tabs and adjustment means for engaging and moving said tabs on said strip to a position opposite said detector means spaced said predetermined number of strip segment lengths from said tabs at said tab placement means.

9. The apparatus claimed in claim 8 in which said one jaw pair is the trailing pair of said jaws relative to the direction of movement of said strip material along said path and further including bi-directional tension control means in said path immediately behind said one jaw pair thereadjacent including means for supplying a retarding tensioning force to said strip material therefrom to said one jaw pair and means therebehind in said path for preventing back-movement of said strip material thereby.

10. The apparatus claimed in claim 1 further including blade deposit means at said segmenting station transversely movable from said path to a position remote therefrom for depositing strip segments in trays and further including thereat rejects means movable under said path and away therefrom responsive to a signal for receiving rejected strip segments.

11. The apparatus claimed in claim 1 in which said one jaw pair is transversely movable about an axis of rotation parallel to and spaced from said path.

12. Apparatus for segmenting strip material comprising:
    a supply station at one end and a segmenting station at the other end defining a strip path therebetween;
    a rotatable member at said supply station for rotatably receiving a supply coil of said strip material;
    a pair of driven pullout rollers spaced along said path from said supply station for drawing said strip material from said supply coil thereof, and for feeding said strip material into a slack loop thereof immediately thereafter at the average speed of said strip material incrementally through the remainder of said apparatus;
    tension control and brake means intermediate said rotatable member and said pullout rollers for maintaining a predetermined minimum tension on said strip material at said coil and for braking said coil in response to a tension decrease below a predetermined level;
    retarding means along said path after the position of said loop at said rollers for exerting a retarding tensioning force to said strip material as it passes thereby;
    tab placement means along said path after said retarding means, spaced a predetermined number of strip segment lengths before a segmenting position at said segmenting station, for affixing pairs of tabs in abutment on said strip material with the position between said tabs said predetermined number of strip segment lengths before said segmenting position, thereby defining ends of adjacent strip segments;
    fine adjustment and tab detector means spaced along said path a predetermined number of strip segment lengths between said segmenting position and said tab placement means, including conductive means for detecting the presence or absence of said tabs and means for engaging and moving said tabs on said strip to a position opposite said detector means spaced said predetermined number of strip segment lengths from said tabs at said tab placement means;
    bi-directional tension control means spaced along said path between said fine adjustment and tab detector means and said segmenting position for exerting a retarding tensioning force therefrom to said segmenting position and for preventing back-movement of said strip material therebehind;
    two pairs of adjacent segmenting jaws at said segmenting station having an aligned clamping bite along said path for gripping said tabs between said jaw pairs, the position between said adjacent pairs of jaws defining said segmenting position, the trailing one of said jaw pairs relative to the direction of strip movement therethrough being transversely movable, about an axis of rotation parallel to and spaced from said path, relative to said path and the lead jaw pair for segmenting said strip material at the position between said tabs as said tabs are gripped by said jaw pairs; and means for incrementally advancing said strip material with said tabs thereon along said path to said segmenting position between said pairs of segmenting jaws.

13. The apparatus claimed in claim 12 further including blade deposit means along said path after said pairs of jaws transversely movable between said path and a position remote therefrom for depositing strip segments in trays at said remote position thereof.

14. The apparatus claimed in claim 12 further including inspection means along said path between said retarding means and said segmenting position for detecting defective portions of said strip material and also further including rejects means, along said path after said pairs of jaws, movable under said path in response to a signal from said inspection means for receiving rejected strip segments therein.

15. The apparatus claimed in claim 14 further including blade deposit means along said path after said pairs of jaws transversely movable between said path and a position remote therefrom for depositing strip segments in trays at said remote position thereof.

16. Segmenting means for segmenting strip material, comprising:

two pair of clamping jaws having clamping portions with their bite aligned with the path of said strip material for gripping said strip material therebetween, said pairs of jaws being positioned adjacent each other;

the jaws of one of said jaw pairs being rotatably mounted at a first common pivot generally aligned with the bite thereof and generally parallel to and spaced from said path for transverse rotatable movement relative to said path and the other of said jaw pairs segmenting said strip material.

17. The means claimed in claim 16 further including an extension of each jaw of said one pair to the other side of said common pivot from said clamping portion thereof, said extensions of said jaws providing transversely spaced apart ends thereof; said extensions each connected at their ends to a link; said links extending from said extensions and pivotally connected at a second common pivot parallel to and generally aligned with said first common pivot and said path; one said extension being pivotally connected to one of said links; the other of said links having a slot therein extending generally along a line defined by the point of connection with said other extension and said second common pivot; said other of said extensions slidably connected to said other link in said slot; one end of said slot being defined by the position of said other extension therein, with the bite of said jaws of said one pair in an aligned clamping position in said path; the other end of said slot located at a position extending from said one end thereof in a direction opposite the direction of a force applied at said second common pivot required to close said one pair of jaws; and biasing means connected to said other jaw end urging said other jaw end in said direction.

18. The means claimed in claim 17 in which said jaws of said one pair cross in scissors fashion at said first common pivot to said extensions.

19. The means claimed in claim 18 in which said first and second common pivot are on the same side of the bite of said jaws and said other end of said slot is remote from said second common pivot relative to said one end of said slot.

References Cited

UNITED STATES PATENTS

| | | | |
|---|---|---|---|
| 3,152,499 | 10/1964 | Moelbert | 83—378 X |
| 3,303,979 | 2/1967 | Lang | 225—103 X |

JAMES M. MEISTER, Primary Examiner

U.S. Cl. X.R.

76—1